United States Patent [19]

Kawabata et al.

[11] Patent Number: 4,517,854
[45] Date of Patent: May 21, 1985

[54] LOW-VIBRATION STEERING DEVICE

[75] Inventors: Yasuhiro Kawabata, Obu; Yoshio Kadokawa, Nagoya; Nobuyuki Mori, Nagoya; Shinji Suzuki, Nagoya, all of Japan

[73] Assignees: Kabushiki Kaisha Toyoda Jidoshokki Seisakusho; Kabushiki Kaisha Toyota Chuo Kenkyusho, both of Japan

[21] Appl. No.: 441,764

[22] Filed: Nov. 15, 1982

[30] Foreign Application Priority Data

Nov. 25, 1981 [JP] Japan .................. 56-174823[U]

[51] Int. Cl.³ .................. B62D 1/16; F16C 27/06
[52] U.S. Cl. .................. 74/492; 280/780
[58] Field of Search .......... 74/492, 493; 280/779, 280/780; 384/215, 220, 222, 298, 299

[56] References Cited

U.S. PATENT DOCUMENTS

| 1,555,214 | 9/1925 | Johnson | 280/780 |
| 1,746,889 | 2/1930 | Fitzer | 384/215 |
| 2,462,011 | 2/1949 | Thiry | 384/220 |
| 2,936,141 | 5/1960 | Rapata | 384/215 X |
| 3,300,229 | 1/1967 | Kishune | 280/780 |

FOREIGN PATENT DOCUMENTS 896550 5/1962 United Kingdom .......... 280/780

Primary Examiner—Allan D. Herrmann
Attorney, Agent, or Firm—Parkhurst & Oliff

[57] ABSTRACT

A low-vibration steering device for use on industrial vehicles comprising a steering shaft rotatably supported at its lower end by a gearbox and connected to a steering wheel at its upper end, a tubular steering column enclosing the steering shaft with an annular spacing left between the inside diameter of the steering column and the outside diameter of the steering shaft, a steering column clamp secured to a chassis frame of the vehicle and holding the steering column at a portion above its middle portion, a flexible vibration shutoff member disposed between a lower end portion of the steering column and a portion of the steering shaft near its lower end to support the said lower end portion by said portion near said lower end, and an oil-impregnated bearing interposed between an upper end portion of the steering column and a corresponding upper end portion of the steering shaft and having a greater rigidity than the flexible member. The flexible member may be disposed between a lower end portion of the steering column and the gearbox to connect the former with the latter. The configuration of the flexible member is determined so that an elastic constant thereof is kept comparatively small while a load applied thereto due to a radial movement of the lower portion of the steering column relative to the steering shaft is small, but the constant becomes large when the load exceeds a preset limit.

15 Claims, 12 Drawing Figures

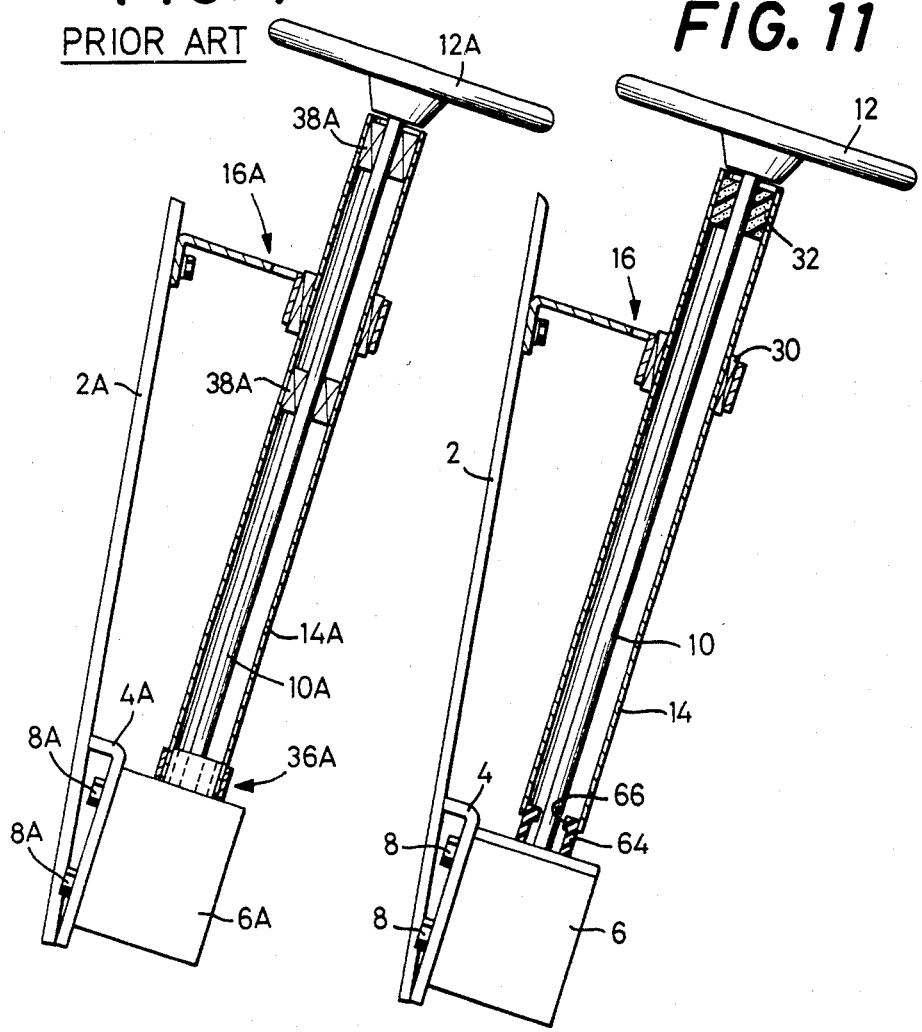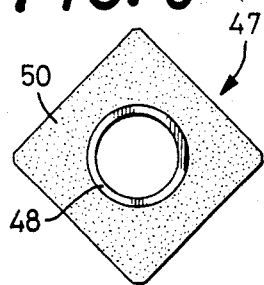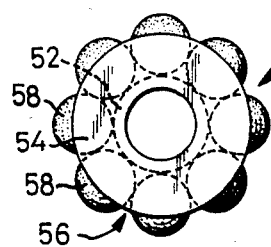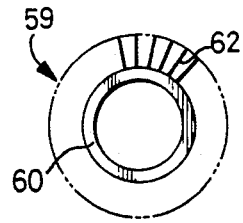

LOW-VIBRATION STEERING DEVICE

BACKGROUND OF THE INVENTION

The present invention relates to a steering device suitably used in fork lift trucks and other industrial vehicles.

It is known in the art that a steering device for use on fork lift trucks, constructional and agricultural and other industrial vehicles, comprises: a steering shaft which has a steering wheel fixed to its upper end and is rotatably supported at its lower end by a gearbox secured to a chassis frame of the vehicle; a steering column of tubular configuration rotatably supporting and enclosing the steering shaft with an annular spacing or radial gap between the outside diameter of the shaft and the inside diameter of the column; and a column clamp fixed to the chassis frame and holding the steering column at a longitudinally upper portion thereof. Although this type of steering device is simple in structure and sufficiently rigid, it suffers shortcomings that the steering wheel vibrates and the vibration makes a vehicle operator uncomfortable. These shortcomings are aggravated particularly when the vehicle uses a diesel engine as a drive source.

To solve the above shortcomings, the conventional types of steering devices were investigated and examined in detail through both experimental and theoretical approaches, and the following fact was found evident.

There are two causes for vibration of a steering wheel. One is a resonance between the steering device and a vehicle engine, and the other is a forced vibration, i.e., an oscillating movement transmitted from a chassis frame to the steering device. In more detail, engines vibrate at a frequency which is a multiple of the number of revolutions (rpm) thereof. Specifically, a four-cylinder engine vibrates at the greatest magnitude at a frequency level which is two times the engine revolution. The steering device vibrates in resonance with the vibration of the engine at such frequency when the vibrating frequency of the engine coincides with a natural frequency of the steering device. Since a conventional steering device has a point of resonance within a normal running speed range of an engine (e.g. 600 to 2,400 rpm), the steering device starts to oscillate when the running speed or revolution of the engine reaches a level corresponding to the specific resonance point. On the other hand, as the steering device is connected to the vehicle chassis frame via a gearbox and a steering column clamp, the oscillatory movements of the chassis frame are transmitted to the steering device through those two connection points or members.

In view of the above analysis, prevention of the vibration of the steering wheel requires that the resonance point of the steering device be shifted out of the normal running speed range of the engine. To shift the resonance frequency of the steering wheel, it is effective to reduce the rigidity of connection of the steering device with the chassis frame. The reduction of the above-mentioned rigidity may produce the other cause for vibration, i.e., a forced vibration (an oscillating movement transmitted from a chassis frame to the steering device). In order to reduce the forced vibration, it is necessary to change the shape of vibration mode of the steering device in which the amplitude of the vibration is small at the position of the steering wheel. Furthermore, a mere reduction of the rigidity of connection of the steering device with the chassis frame will cause the steering wheel to be easily moved in the radial directions and thereby reduce not only an ease of operation thereof by an operator but also its capability of supporting the operator's weight when the vehicle is started, stopped or turned. Therefore, it is required to construct the steering device such that the transmission of the vibration from the chassis frame to the steering device is effectively shut off while the above problem of reduced operationability and weight supporting capability of the steering wheel is overcome at the same time.

SUMMARY OF THE INVENTION

The present invention was made in consideration of the above analysis and finding. It is accordingly a primary object of the invention to provide a steering device wherein the vibration of a steering wheel is kept to a minimum.

Another object of the invention is to provide a steering device which is easy to be operated by a vehicle operator and sufficiently capable of supporting the operator's weight upon starting, stopping and turning of the vehicle.

Still another object of the invention is to provide a steering device wherein both steering column and gearbox have a high dust sealing capability.

A low-vibration steering device for a vehicle according to this invention comprises: a gearbox provided on a chassis frame of the vehicle; a steering shaft rotatably supported by the gearbox at a lower end thereof; a steering wheel provided on an upper end of the steering shaft; a tubular steering column enclosing the steering shaft and rotatably supporting the steering shaft by at least one annular insert interposed between an inner wall of the tubular steering column and an outer wall of the steering shaft; and a column clamp holding the tubular steering column at a predetermined portion thereof, secured to the chassis frame, whereby the tubular steering column is mechanically isolated from the direct connection to the gearbox, the natural frequency of the vibration in the whole of the steering device is reduced and the vibration in the whole of the steering device is reduced.

In the above steering device, the lower end of the steering column which is in the prior art rigidly fixed to the gearbox, is disconnected from the gearbox with a result of lowering the natural frequency of the steering device and thus shifting the resonance point of the same out of a normal running speed range of an engine of the vehicle. At the same time, the oscillating movements of the vehicle chassis frame conventionally transmitted to the steering column via the gearbox are shut off. The steering column is thus disconnected from the gearbox but the steering shaft is still connected to the gearbox. However, the vibration transmitted from the gearbox to the steering wheel via the steering shaft is not so great because the rigidity of the steering shaft is extremely lower than that of the steering column.

In the low-vibration steering device according to one preferred aspect of the invention, the steering column is thus disconnected from the gearbox, and the flexible vibration shut-off insert designed as the annular insert is disposed between a lower end portion of the steering column and the steering shaft. In this structure, the vibration transmitted from the steering shaft and the gearbox to the steering column is isolated and absorbed by the flexible vibration shut-off insert and the lower end of the steering column is freely maintained in movement thereof.

In the low-vibration steering device according to another preferred aspect of the invention, the bearing is added to said one preferred aspect of the invention, i.e., interposed between an upper end portion of the steering column and a corresponding upper end portion of the steering shaft, the bearing having a greater rigidity than the vibration shutoff insert. Consequently, the mode of the vibration in the steering device is changed by the bearing and the flexible vibration shut-off insert and the node in this mode of the vibration in the steering device is positioned at the upper portion of the steering column and the vibration displacement of the steering wheel itself is smaller than that of the steering wheel in the prior art having a soft insert at the upper end thereof.

Furthermore, as compared with the steering device of the prior art, the steering device according to the another aspect of the present invention reduces the vibration of the chassis frame transmitted from the column clamp to the steering shaft by the flexible vibration shut-off insert. The steering device of the prior art vibrates such that the clamp to the gearbox is the node of the vibration. The steering shaft also vibrates such that the clamp to the gearbox is the node of the vibration. The vibration amplitude of the steering wheel is large.

In the steering device according to another aspect of the present invention, as described above, since the node of the vibration is shifted to the upper portion from the clamp, the distance between the steering wheel and the node of the vibration becomes short and the amplitude of the vibration in the steering wheel becomes small. The minimum radial movements of the steering wheel discussed above facilitate the manipulation of the steering wheel by the operator and permit the wheel to provide a highly stable support for the operator upon turning of the vehicle or on other occasions.

According to the other preferred aspect of the invention, a low-vibration steering device comprises: a gearbox secured to a chassis frame of the vehicle on which the steering device is mounted; a steering shaft rotatably supported at its lower end by the gearbox; a steering wheel connected to an upper end of the steering shaft; a tubular steering column enclosing the steering shaft with an annular spacing left between the inside diameter of the steering column and the outside diameter of the steering shaft; a column clamp secured to the chassis frame and holding the steering column at its portion longitudinally above its middle portion; a flexible vibration shut-off member disposed between a lower end portion of the steering column and the gearbox and connecting the former with the latter; and a bearing interposed between an upper end portion of the steering column and a corresponding upper end portion of the steering shaft, said bearing having a greater rigidity than the vibration shut-off member.

The above form of the steering device offers substantially the same functions and capabilities as the previously described form of the steering device. In addition, this second embodiment of the steering device has an advantage that the entry of dust or dirt into gaps between the lower portion of the steering column and the top of the gearbox, and the lower portion of the steering column is prevented by the flexible vibration shut-off member which is disposed so as to block a gap between the lower end of the steering column and the top of the gearbox.

In all aspects of the steering device described above, it is preferred that the flexible vibration shut-off insert or member has a load characteristic in which an elastic constant thereof is kept comparatively small while a load applied thereto due to a radial movement of the lower portion of the steering column relative to the lower portion of the steering shaft is small and the elastic constant becomes large when the load exceeds a limit, thereby effectively absorbing the vibration transmitted from the chassis frame to the steering column and limiting the radial movement of the steering wheel upon application of radial forces thereto by the operator to a comparatively small level.

These and other objects and advantages of the invention may be readily appreciated by reference to the following description, taken in connection with the accompanying drawings.

BRIEF DESCRIPTION OF THE DRAWINGS

The present invention is illustrated in the accompanying drawings in which:

FIG. 7 is a side elevation, in cross section, of the conventional steering device;

FIGS. 8–10 are plan views of different flexible inserts used in other embodiments of the invention; and FIG. 11 is a side elevational cross section of a further embodiment of the invention.

DETAILED DESCRIPTION OF THE PREFERRED EMBODIMENTS

Referring now to the accompanying drawings, preferred embodiments of the invention are described in details.

Figure 1:
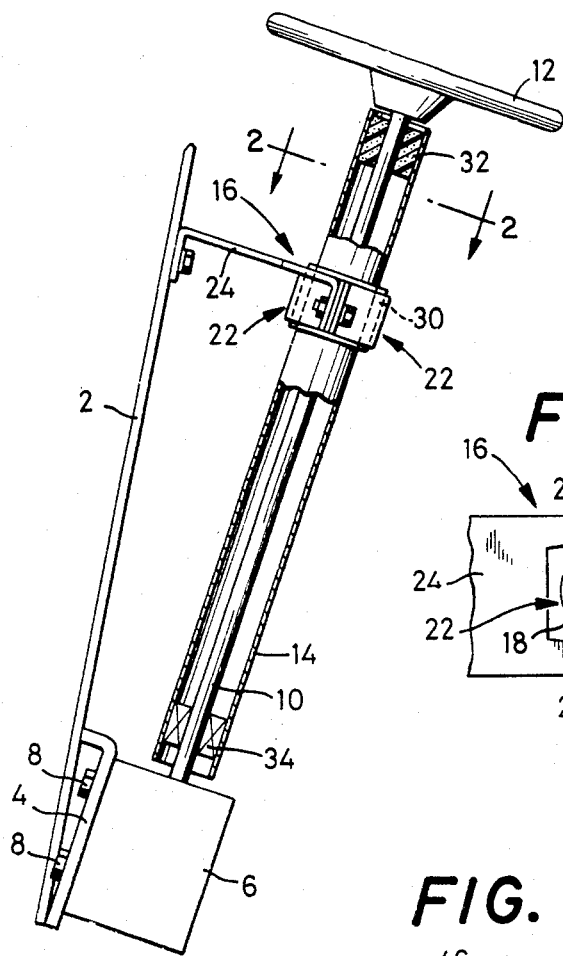
FIG. 1 is a side elevation, in cross section, of one embodiment of a low-vibration steering device of the invention.

There is shown in FIG. 1 a front protector 2 which is a part of the chassis frame of a fork lift truck. To a lower end portion of the front protector 2, is fixed by welding or other suitable means a bracket 4 to which a gearbox 6 is secured with bolts 8. A steering shaft 10 extends upwardly from inside the gearbox 6 and a steering wheel 12 is fixed to the upper end of the steering shaft 10. The steering shaft 10 is rotatably supported, at its lower end portion, with a bearing (not shown) within the gearbox 6 and operatively coupled to a steering gearing housed in the gearbox 6.

Figure 2:
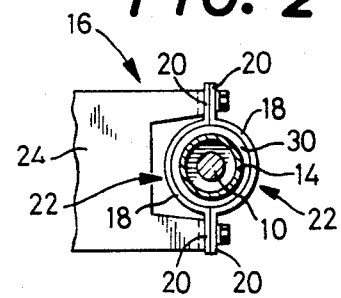
FIG. 2 is a cross section taken along line 2—2 of FIG. 1.

The steering shaft 10 is enclosed by a steering post or column 14 of tubular configuration with a sufficient annular spacing or radial gap between the outside diameter of the shaft 10 and the inside diameter of the column 14. The steering column 14 is connected, at a portion thereof longitudinally above the middle portion, to the front protector 2 with a column clamp 16. As clearly seen in FIG. 2, the column clamp 16 includes a pair of gripping members 22 each having a semi-circular grip portion 18 and a pair of flanges 20 which extend from the opposite ends of the semi-circular grip portion 18 radially outwardly of a circle defined by the grip portions 18 when the gripping members 22 are assembled with the flanges 20 of one member in contact with the flanges 20 of the other member such that the semi-circular grip portions 18 form a cylindrical housing. The thus assembled gripping members 22 grip the steering column 14 on its external surface via a grommet 30 made of rubber, and are bolted at their flanges 20 to a connecting member 24 which in turn is bolted to the front protector 2.

Figure 3:
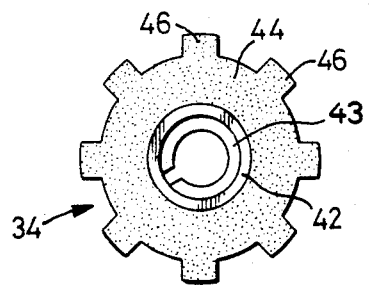
FIG. 3 is a plan view of a flexible vibration shutoff insert used in the steering device of FIG. 1.
Figure 4:
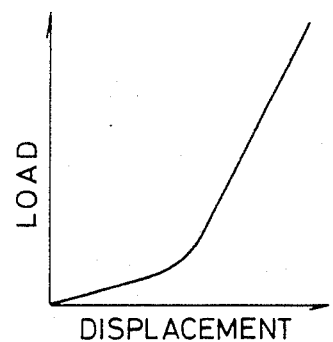
FIG. 4 is a graphical representation of load characteristic of the flexible insert shown in FIG. 3.

There is inserted, between the upper end portions of the steering column 14 and the steering shaft 10, a bearing 32 which is made of oil-impregnated plastic, i.e., synthetic resin impregnated with grease or other lubricants. The bearing 32 has a certain degree of vibration damping capability and an excellent wear resistance, and rotatably supports the upper end portion of the steering shaft 10. On the other hand, a flexible or vibration shut-off insert 34 is disposed between the lower end portions of the steering column 14 and the steering shaft 10. The flexible insert 34 consists of a cylindrical metallic inner ring 42, a nylon bush 43 disposed between the outer wall of the steering shaft and the inner wall of the inner ring 42, and a rubber member 44 secured to the external peripheral surface of the inner ring 42, as illustrated in FIG. 3. The rubber member 44 has an annular body portion 44 of thick wall, and a plurality of radial protrusions 46 equally spaced on the external peripheral surface, and extending axially, of said body portion 44. The insert 34 is press-fitted in the steering column 14 such that the radial protrusions 46 are slightly compressed against the internal peripheral surface of the column 14. This construction is intended to give the insert 34 a load-displacement characteristic in which an elastic constant thereof is small while its deformation magnitude is small but the elastic constant becomes greater when the deformation magnitude exceeds a preset level as shown in FIG. 4. The radial protrusions 46 are deformed when a comparatively small amount of load is applied thereto, so that the transfer of vibration from the steering shaft 10 toward the steering column 14 or vice versa is effectively prevented while the lower end portion of the steering column 14 is supported only by the radial protrusions 46 as in usual conditions. When a large amount of radial load is applied to the steering wheel 12 by the operator or driver of the vehicle at the time of a sudden stop thereof or when the driver gets on and off the vehicle while grasping the steering wheel, however, the lower end portion of the steering column 14 is supported by the external peripheral surface of the annular body portion 44, whereby the displacement of the said lower portion relative to the steering shaft 10 is prevented. It is noted here that the steering shaft 10 is rotatable within the inner ring 42.

Figure 5A:
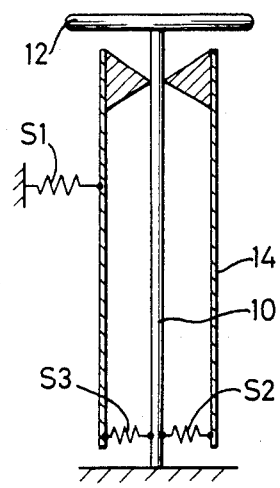
FIG. 5a is a view explaining the principle of vibration of the steering device of FIG. 1 when the same is viewed as a vibratory unit.

In principle, the steering device of this invention may be considered to be a vibration system as shown in FIG. 5a, wherein a spring S1 represents the resiliency of the grommet 30, and springs S2 and S3 stand for the resiliency of the insert 34. This vibration system is completely different from that of a conventional steering device shown in FIG. 5b for the purpose of comparison.

Figure 5B:
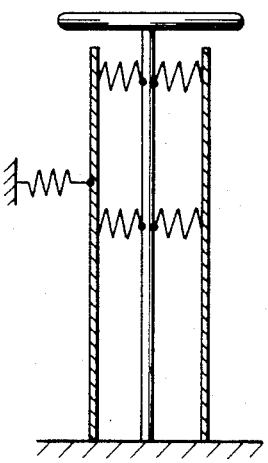
FIG. 5b is a similar view of a conventional steering device.

In FIG. 5b, the steering column is connected with the gearbox. In FIG. 5a, the steering column is disconnected from the gearbox. As the vibration system in FIG. 5a is quite different from that in FIG. 5b by disconnecting the steering column from the gearbox, the natural frequency of the steering device shown in FIG. 5a is lower than that of the steering device shown in FIG. 5b and the level of the vibration in the steering device is reduced.

The vibration transmitted to the steering column 14 by the spring S1 is absorbed by elastic deformation of springs S2 and S3 which act as the flexible vibration shutoff insert and the vibration displacement of the steering wheel itself is smaller than that of the steering wheel shown in FIG. 5a.

Figure 6:
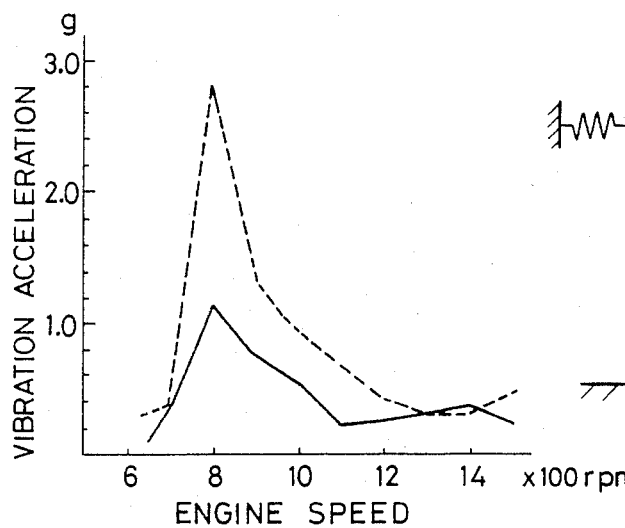
FIG. 6 is a graph showing vibration characteristic of the present steering device as compared with that of the conventional steering device.

Referring next to FIG. 6, there are shown in solid line results of vibration tests which were conducted on the steering device with the above construction mounted on a fork lift truck powered by a diesel engine. While the steering wheel vibrates in various directions, FIG. 6 indicates the measurements of the vibration in the longitudinal (back and forth) direction of the truck because the vibration in that direction was found most dominant during the tests. For comparison, the figure also shows the test result of a conventional steering device as shown in FIG. 7, whose steering column 14A is rigidly connected to a gearbox 6A by a clamp 36A. Between the upper end and intermediate portions of the steering column 14A and the corresponding portions of the steering shaft 10A, there are disposed a pair of rubber-made inserts 38A. Since other parts of this conventional device are identical to the steering device according to this invention, like elements are designated by like reference numerals with a letter "A" attached and their detailed description is omitted herein. In FIG. 6, a broken line indicates vibration characteristics of the conventional steering device, comprising the resonance vibration of the steering device and the forced vibration of the chassis frame. Particularly, the vibration of the steering wheel is severe where the engine speed is at about 800 rpm, which is caused by the resonance between the steering device and the engine. In the case of the steering device of the present invention described above, the reduction of the resonant frequency of the steering device changes the vibration peak thereof to be shifted out of the normal running speed range of the engine and reduces the level of the vibration in the steering system during the normal running speed range of the engine.

Further, in the case of the steering device of the present invention, the shape of the vibration mode in the steering device is changed from that in the conventional device by disconnecting the steering column from the gearbox and further providing the flexible vibration shut-off insert S2, S3 and the rigid bearing.

Namely, in the present invention the node of the vibration mode in the steering device is positioned at the upper end of the steering column near the steering wheel, and the antinode thereof is positioned at the lower end of the steering column. Accordingly in the present invention in response to the forced vibration from the chassis frame, the steering column is swingable around the upper end thereof as the fulcrum near the steering wheel, so that the level of the vibration in the steering wheel is reduced.

On the other hand, in the conventional device, the node thereof is positioned at the lower end of the steering column and the antinode thereof is positioned at the upper end thereof, so that the level of the vibration in the steering wheel is very high.

The above analysis clearly indicates a great improvement in restraint of the vibration of the present steering device over the conventional device. In other words, for damping the vibration, it is more effective to disconnect the steering column from the gearbox, support the column by the lower part of the steering shaft via a flexible insert and at the same time use a comparatively rigid bearing between the upper end portions of the steering column and shaft, as in the present embodiment, than to rigidly connect the steering column to the gearbox and use a rubber-like insert between the upper parts of the steering column and shaft, as in the conventional steering device.

Although the invention has been described in its preferred form with a certain degree of particularity, it is to be understood that the invention is practiced in various forms. For example, the insert 34 in the previous embodiment may be replaced by any one of inserts shown in FIGS. 8-10. The insert 47 of FIG. 8 comprises a metallic inner ring 48 and a substantially square (in plan) rubber member 50 secured to the external peripheral surface of the inner ring 48, and is press-fitted in the steering column 14 with the four corner sections of the rubber member 50 in compressed relation with the column 14. The four corner sections of the rubber member 50 demonstrate a characteristic wherein an elastic constant thereof is small in the initial stage of deformation but the constant becomes greater as the deformation proceeds, and therefore have effects identical to those of the insert 34 used in the preceding embodiment. In this connection, the rubber member 50 may be triangular or pentagonal. The insert 51 illustrated in FIG. 9 includes a retainer 56 having a metallic inner ring 52 and a pair of radial flanges 54 extending from the axially opposite ends of the inner ring 52, and a plurality of rubber-like balls 58 disposed between the flanges 54 and along a circle concentric with the ring 52. The insert 51 is press-inserted in the steering column 14 with the balls 58 compressed by a predetermined radial distance. When the steering wheel 12 is turned, the lower end portion of the steering shaft 10 is rotated within the inner ring 52 but the balls 58 which are compressed the predetermined amount are kept virtually unrotated and therefore the retainer 56 is also kept unrotated. The balls 58 may be replaced by rollers. Finally, the insert 59 shown in FIG. 10 includes an inner ring 60 and a multiplicity of radial wires 62 of different lengths extending from the external peripheral surface of the inner ring 60. The insert 59 is inserted in the steering column 14 so that the ends of the longest wires 62 are kept in abutment on the internal surface of the column 14.

Similarly, the bearing disposed between the upper end portions of the steering column 14 and the steering shaft 10 is not limited in material thereof to an oil-impregnated plastic, but may be made of ordinary synthetic resins, hard rubbers, bearing alloys such as gun metals, oil-impregnated sintered alloys and the like.

As a further example of modification, the lower end portion of the steering column 14 disconnected from the gearbox must not be necessarily supported by the steering shaft 10 but may be supported by the gearbox 6 via a flexible member 64 as shown in FIG. 11. As is apparent from the figure, the member 64 is of annular shape, secured at the lower end to a top plate of the gearbox 6, and fitted at its upper end portion in the lower end portion of the steering column 14. In short, all that is required of the lower end portion of the steering column 14 is to support it such that it receives a minimum vibration from the gearbox 6 and is relatively free to move in the radial directions relative to the steering shaft 10. In this instance, however, it is also preferable that the lower end portion of the steering column 14 be prevented from radially moving a great distance when a considerable magnitude of radial force is exerted to the steering wheel. To this end, the flexible member 64 is formed with a radially inwardly projecting flange 66 at the upper end thereof, such that a part of the radially inner surface of the flange 66 abuts on the surface of the steering shaft 10 when the lower end portion of the steering column 14 is radially displaced more than a predetermined distance, whereby a further radial movement of the steering column 14 is blocked. This specific form of a steering device wherein the air gap between the steering column 14 and the gearbox 6 is blocked by the member 64 provides an advantage that there is no need for employing a dust sealing member.

What is claimed:

1. A low-vibration steering device for a vehicle, comprising:
    a gearbox provided on a chassis frame of the vehicle,
    a steering shaft rotatably supported by said gearbox at a lower end thereof,
    a steering wheel provided on an upper end of said steering shaft,
    a tubular steering column enclosing said steering shaft and rotatably supporting said steering shaft by at least one annular insert interposed between an inner wall of said tubular steering column and an outer wall of said steering shaft, said tubular steering column being mechanically isolated from direct connection to said chasis frame, said gearbox and a floor of the vehicle, and
    a column clamp holding said tubular steering column at a portion thereof which is longitudinally above a middle portion and near a node in a vibrational mode of said tubular steering column, said column clamp being secured to said chassis frame,
    whereby said tubular steering column is supported by said chassis substantially only through said column clamp, and the natural frequency of vibration of the whole of the steering device is reduced and the vibration in the whole of the steering device is reduced.

2. A low-vibration steering device as recited in claim 1, wherein
    said at least one annular insert of said tubular steering column comprises a flexible vibration shut-off insert made of a flexible material and disposed near a lower portion of said tubular steering column.

3. A low-vibration steering device as recited in claim 2, wherein
    said at least one annular insert of said tubular steering column further comprises a bearing of greater rigidity than said flexible vibration shut-off insert, and disposed near an upper end of said tubular steering column.

4. A low-vibration steering device as recited in claim 2, wherein a configuration of said flexible vibration shut-off insert is determined so that an elastic constant thereof is kept comparatively small while a load applied thereto due to a radial movement of the lower portion of said steering column relative to said steering shaft is small, said elastic constant becoming large when said load exceeds a pre-determined limit.

5. A low-vibration steering device as recited in claim 2, wherein a configuration of said flexible vibration shut-off insert is determined so that an elastic constant thereof increases as a load applied thereto due to a radial movement of the lower portion of said steering column relative to said steering shaft increases.

6. A low-vibration steering device as recited in claim 4, wherein said flexible shut-off insert comprises a rubber member and an inner ring made of a material harder than rubber, said rubber member having an annular body portion, and a plurality of radial protrusions formed on an external peripheral surface of said body portion and contacting the inner wall of said steering column, said inner ring being secured to the internal peripheral surface of said annular body portion.

7. A low-vibration steering device as recited in claim 6, wherein said radial protrusions are spaced circumferentially, and extend axially, of said body portion.

8. A low-vibration steering device as recited in claim 5, wherein said flexible vibration shut-off insert comprises a polygonal rubber member having a central bore through the thickness thereof, and an inner ring made of a material harder than rubber and secured to an internal peripheral surface of said rubber member defining said bore, said rubber member contacting the inner wall of said steering column.

9. A low-vibration steering device as recited in claim 5, wherein said flexible vibration shut-off insert comprises a ball retainer, and a plurality of rubber balls retained by said ball retainer and disposed in said annular spacing along a circle concentric with said steering column such that said balls contact the inner wall of said steering column.

10. A low-vibration steering device as recited in claim 5, wherein said flexible vibration shut-off insert comprises an inner ring and a multiplicity of radial wires of different lengths extending from an external peripheral surface of said inner ring, ends of the longest ones of said radial wires contacting the inner wall of said steering column.

11. A low-vibration steering device as recited in claim 1, wherein said column clamp comprises a grommet made of rubber contacting the outer wall of said steering column.

12. A low-vibration steering device as recited in claim 3, wherein said bearing is formed of a synthetic resin impregnated with lubricant.

13. A low-vibration steering device for a vehicle, comprising:
a gearbox provided on a chassis frame of the vehicle,
a steering shaft rotatably supported by said gearbox at a lower end thereof,
a steering wheel provided on an upper end of said steering shaft,
a tubular steering column enclosing said steering shaft and rotatably supporting said steering shaft by at least one annular insert interposed between an inner wall of said tubular steering column and an outer wall of said steering shaft,
a column clamp holding said tubular steering column at a predetermined portion thereof and secured to said chassis frame, and
a flexible vibration shut-off member disposed between a lower end portion of said steering column and said gearbox and connecting the former with the latter,
said at least one annular insert comprising a bearing interposed between an upper end portion of said steering column and a corresponding upper end portion of said steering shaft, said bearing having a greater rigidity than said vibration shut-off member.

14. A low-vibration steering device as recited in claim 13, wherein a configuration of said flexible vibration shut-off member is determined so that an elastic constant thereof is kept comparatively small while a load applied thereto due to a radial movement of the lower portion of said steering column relative to the lower portion of said steering shaft is small, said elastic constant becoming large when said load exceeds a limit.

15. A low-vibration steering device as recited in claim 14, wherein said flexible vibration shut-off member is an annular body made of rubber, a lower end portion thereof being secured to said gearbox and an upper end portion thereof fitting in the lower end portion of said steering column, an internal peripheral surface of at least said upper end portion of said annular body facing the outer wall of said steering shaft with an annular clearance normally maintained therebetween, a part of said annular clearance becoming absent due to elastic deformation of said annular body upon application of a large radial force to said steering wheel by an operator of the vehicle.

* * * * *